(12) United States Patent
Duisenberg et al.

(10) Patent No.: US 8,239,539 B2
(45) Date of Patent: Aug. 7, 2012

(54) MANAGEMENT PROCESSORS COOPERATING TO CONTROL PARTITION RESOURCES

(75) Inventors: Kenneth C. Duisenberg, Roseville, CA (US); Stephen B. Lyle, Granite Bay, CA (US); Rajeev Grover, Rocklin, CA (US); Loren M. Koehler, Fair Oaks, CA (US); Ivan Farkas, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 12/639,360

(22) Filed: Dec. 16, 2009

(65) Prior Publication Data

US 2011/0145422 A1    Jun. 16, 2011

(51) Int. Cl.
*G06F 13/00*    (2006.01)
(52) U.S. Cl. .................. 709/226; 709/202; 709/203
(58) Field of Classification Search .................. 709/201, 709/202, 203, 223, 226
See application file for complete search history.

(56) References Cited

U.S. PATENT DOCUMENTS

| | | | |
|---|---|---|---|
| 6,725,317 | B1 | 4/2004 | Bouchier et al. |
| 6,971,002 | B2 | 11/2005 | Austen et al. |
| 7,103,639 | B2 | 9/2006 | Walton et al. |
| 7,146,515 | B2 | 12/2006 | Harrington et al. |
| 7,340,579 | B2 | 3/2008 | Baldwin et al. |
| 7,461,130 | B1 * | 12/2008 | AbdelAziz et al. ........... 709/208 |
| 7,565,398 | B2 | 7/2009 | Ashok et al. |
| 2007/0027948 | A1 | 2/2007 | Engebretsen |
| 2010/0162036 | A1 * | 6/2010 | Linden et al. ..................... 714/4 |

FOREIGN PATENT DOCUMENTS

WO    2005036367 A2    4/2005
WO    2005036405 A1    4/2005
* cited by examiner

*Primary Examiner* — Viet Vu
(74) *Attorney, Agent, or Firm* — Angela Mae Coxe

(57) ABSTRACT

Systems, methods and computing components are provided for allocating a plurality of computing components among one or more logical partitions. Each of the plurality of computing components may have a management processor that is configured to assume a role among management processors of a partition. Each management processor may then cooperate with other management processors of the partition to control resources of the partition.

18 Claims, 2 Drawing Sheets

MANAGEMENT PROCESSORS COOPERATING TO CONTROL PARTITION RESOURCES

BACKGROUND

A "cluster computing system" is a group of linked computing components working together closely so that in many respects they form a single computer. A plurality of computing components such as blade computers may be used together to form a cluster computing system (e.g., SMP). To this end, multiple blade computers may be inserted into a blade enclosure. The blade enclosure may provide resources, such as power sources, networking, cooling elements (e.g., fans) and backplanes that are shared among multiple blade computers. Sharing these resources between multiple blade computers causes the overall utilization to become more efficient.

In a system of multiple computing components, such as a blade enclosure hosting a plurality of blade computers, each computing component may include a management processor (sometimes referred to as a baseboard management controller or "BMC") that is charged with various management tasks on that computing component. These management tasks may include monitoring temperature, cooling fan speeds, power mode, operating system status, and the like. The management processor of each blade may monitor these parameters and exchange information about these parameters with various outside entities, such as a blade enclosure controller. These communications may occur in many instances using the Intelligent Platform Management Interface (IPMI) protocols.

A plurality of computing components may be allocated among one or more logical partitions. Each logical partition may operate as an independent cluster computing system that has available to it the software and hardware resources of every computing component that forms part of the logical partition. For example, a first subset of blade computers in a blade enclosure may be allocated to a first partition, where they will cooperate to form a first cluster computing system. Likewise, a second subset of blade computers in the enclosure may be allocated to a second partition, where they will cooperate to form a second cluster computing system. Management of partitions is often implemented by an entity outside of the plurality of computing components, such as by a processor on the blade enclosure. Management of resources of each blade may become difficult where each blade includes a separate management processor.

BRIEF DESCRIPTION OF THE DRAWINGS

For a detailed description of embodiments of the disclosure, reference will now be made to the accompanying drawings in which.

DETAILED DESCRIPTION

Systems, methods and computing components are provided for allocating a plurality of computing components among one or more logical partitions. Rather than an outside entity (e.g., an enclosure controller) controlling and/or maintaining partitioning, embodiments of the present disclosure control partitioning internally, using the plurality of computing components themselves.

Figure 1:
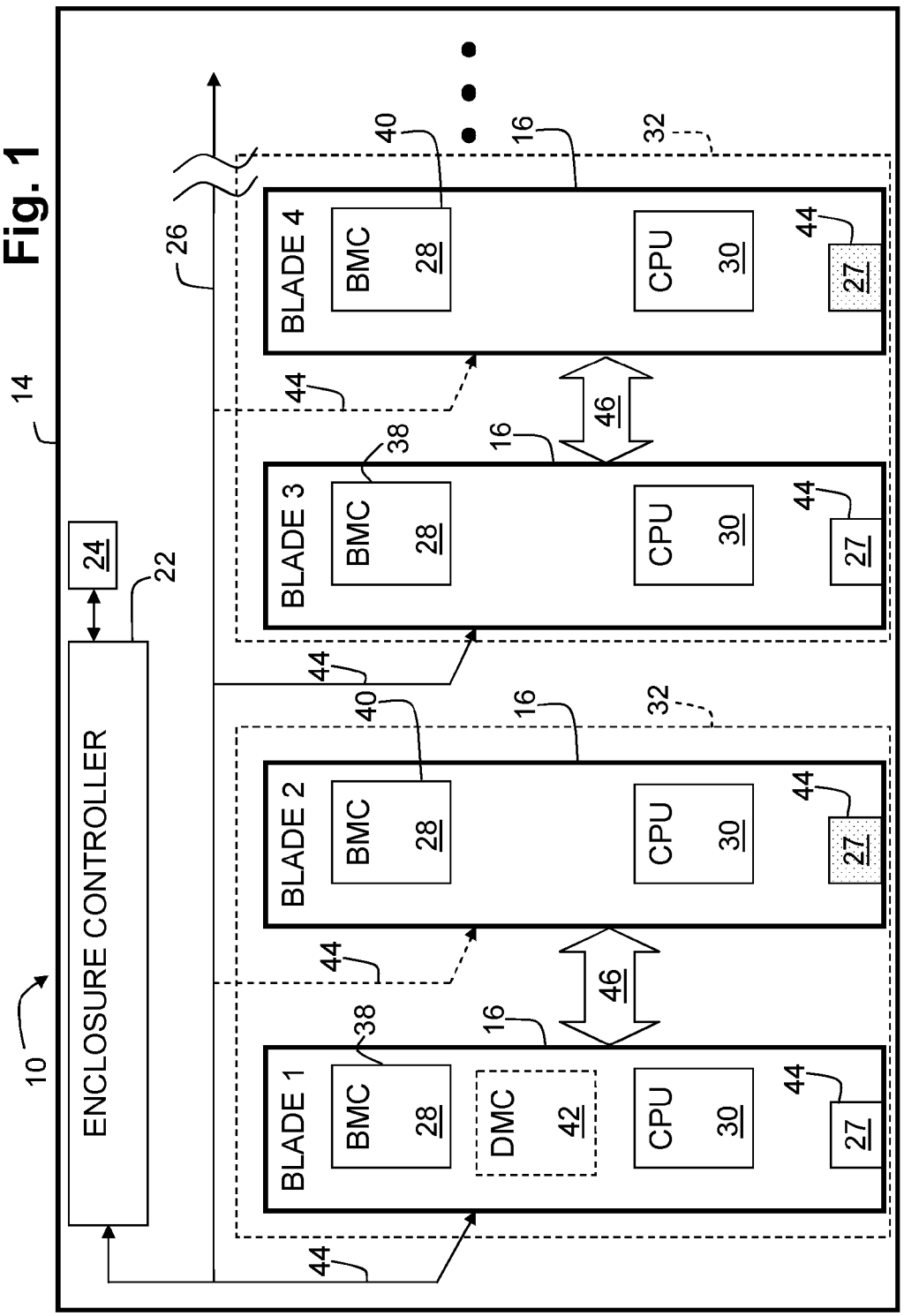
FIG. 1 depicts schematically, a system that includes a plurality of computing components (in this case, blade computers) that are deployed within an enclosure and allocated among a plurality of logical partitions according to an embodiment of the invention.

FIG. 1 depicts an example system 10 that includes an enclosure 14 in which a plurality of computing components 16 are deployed. In this exemplary system 10, each computing component 16 is a blade and enclosure 14 is a blade enclosure. However, it should be understood that the principles of the present disclosure may be applied in other environments where a plurality of computing components 16 are deployed together.

Enclosure 14 may include an enclosure controller 22 that may be configured to interact with the plurality of computing components 16. Enclosure controller 22 may be configured to execute instructions contained in firmware code (e.g., blade management firmware) that is stored in enclosure memory 24 available to enclosure controller 22. Enclosure memory 24 may come in various volatile and non-volatile forms, and in many instances, is flash memory (e.g., EEPROM).

Enclosure 14 may include resources that are to be shared among the plurality of computing components 16 (hereafter referred to as "shared resources"), such as power sources, networking, cooling elements (e.g., fans) and a backplane 26. Such an arrangement is more efficient than clustering together a group of independent computer systems, each of which includes its own resources such as a fan and power supply.

In addition to shared resources provided by enclosure 14, each individual computing component 16 may include its own resources, including memory (e.g., RAM and ROM), as well as input/output devices such as power and reset controls and one or more network interfaces ("NAC") 27. Each computing component 16 may also include a management processor 28 (also referred to as a "baseboard management processor" or "BMC") that manages resources of the particular computing component 16. In traditional systems, users may interact with enclosure controller 22 to communicate directly with management processor 28 of each computing component 16.

Each computing component 16 may also include a separate central processing unit 30 ("CPU"), as shown in this example, although it is not required (e.g., in a blade 18 with a single processor that performs both management functions and processing functions). The CPU 30 provides the "brains" of each computing component 16, executing instructions to provide computer programs such as operating systems or applications to users.

As mentioned above, the plurality of computing components 16 may be allocated among a plurality of logical partitions 32. When multiple computing components 16 are combined to form a logical partition, each computing component's CPU 30 cooperates with the CPUs 30 of the other computing components 16 of the partition 32 to form a cluster computing system.

In FIG. 1, for example, there are four computing components 16, each a blade, that are allocated among two partitions 32 of two computing components 16 each. Although two partitions are shown, other numbers of logical partitions may be implemented using a plurality of computing components 16. Moreover, it should be understood that a logical partition 32 may include any number of computing components 16, including a single computing component 16.

Even though multiple computing components 16 may be used together to form a single partition 32 and, thus, a single cluster computing system, a management processor 28 of each computing component 16 nevertheless may continue to be accessible. For example, each management processor 28 may continue to communicate with and be accessible through enclosure controller 22 (or another outside entity that is configured to exchange IPMI communications). If a logical partition 32 is formed from a relatively large number of computing components 16, managing resources of each individual computing component 16 through the computing component's management processor 28 may be difficult and resource intensive.

Rather than interacting with a management processor 28 of each computing component 16 of a partition 32 on an individual basis, embodiments described herein assign a role to each management processor of a partition. Each management processor of the partition may then cooperate with other management processors of the partition to control resources of the partition.

As used herein, "resources of the partition" may include hardware and software resources of each computing component 16 of a partition 32, such as memory, I/O interfaces, management interfaces and so forth. Resources of the partition may also include hardware resources that are shared among computing components 16 of a partition, such as the "shared resources" described above. Resources of the partition may also include software resources that are shared or distributed among computing components 16, such as an operating system of a cluster computing system formed from a plurality of computing components 16 of a partition 32.

In an exemplary example of cooperation among management processors to control resources of a partition 32, control of all management processors 28 of the partition 32 is delegated to a single management processor 28, referred to herein as the "primary management processor" 38. Each of the other management processors 28 of the partition 32 is relegated to a role of a secondary or "auxiliary" management processor 40 in which it becomes subservient to the primary management processor 38 of the same partition.

Because the primary management processor 38 of a partition 32 acts on behalf of all management processors 28 of the partition 32, it is unnecessary to relinquish control of the partitioning to an outside entity (such as enclosure controller 22). Instead, by adopting the roles described herein, management processors 28 may themselves allocate and control partitioning of the plurality of computing components 16 among a plurality of logical partitions 32.

The plurality of computing components 16 may allocate themselves among the plurality of logical partitions 32 according to a partition description received at each management processor 28 from a domain management controller 42, or "DMC." DMC 42 may be software executing on one of the management processors 28 (typically on a first blade), as indicated by the dashed lines surrounding DMC 42 in FIG. 1. Alternatively, DMC 42 may be a separate hardware processor of a blade, or even a separate computing component 16 of enclosure 14. DMC 42 may control distribution of partition descriptions to the entire enclosure 14.

A partition description may include information identifying the plurality of logical partitions 32, the computing components 16 that are to be assigned to each logical partition, and the role (primary or auxiliary) that is to be assigned to each computing component's management processor 28 within the partition.

DMC 42 may receive a partition description from any number of sources. For example, it may receive a partition description from a network server, from removable media made available to enclosure 14 (e.g., a USB jump drive, CD or DVD), or via manual input at enclosure controller 22 (or elsewhere). In some instances, DMC 42 may receive a partition description from a portable device that is used to physically and/or electronically interconnect each computing component 16 of a partition.

Once DMC 42 receives a partition description, it may forward the description to each management processor 28 of the plurality of computing components 16 in enclosure 14. Each management processor 28 may then assume a role of primary or auxiliary management processor within its partition based upon the received partition description.

A management processor 28 that assumes the role of primary management processor 38 of a partition 32 (also referred to as "monarch" or "master") may be a liaison between outside entities and resources associated with the partition 32. Resources associated with a partition 32 may include resources of each computing component 16 of the partition (e.g., I/O, memory), shared resources provided by enclosure 14 that are associated specifically with that partition 32, and software executing within the partition 32. For example, a primary management processor 38 of a partition 32 may serve as a source for all management interfaces of a partition 32. An example of software executing within the partition 32 is an operating system that is executing on CPUs 30 of the computing components 16 of the partition 32.

To serve as an exclusive liaison for a partition, primary management processor 38 of a partition may enable one or more external interfaces 44. An enabled external interface 44 may serve as an interface from an outside entity to any number of resources associated with the partition. External interface 44 may be a user interface to an operating system executing on one or more computing components 16 of the partition. External interface 44 may additionally or alternatively be a management interface for interacting directly with the primary management processor 38. External interface 44 may also be a NAC 27 on the same computing component 16 as the primary management processor 38; in such cases, primary management processor 38 may be configured to establish a network connection on behalf of the entire partition. In sum, external interface 44 may be a communication pathway from outside entities to primary management processor 38 that is used to manage resources associated with the partition.

An example of this is seen in FIG. 1. Each computing component 16 has two external interfaces 44; one that connects to backplane 26 and the other that is a NAC 27. Management processor 28 of the computing component 16 labeled BLADE 1 has assumed a role of primary management processor 38 of the first partition 34. Accordingly, BLADE 1 has both of its external interfaces 44 enabled.

All other management processors 28 in a partition 32 other than the primary management processor 38 may assume a role of auxiliary management processor 40 (also referred to as a "slave"). Auxiliary management processors 40 of a partition 32 may be subservient to the primary management processor 38 of the same partition 32.

For example, in FIG. 1, management processor 28 of the computing component 16 labeled BLADE 2 has assumed a role of an auxiliary management processor 40 of the first partition 34. Accordingly, BLADE 2 has both its external interfaces 44 disabled. This is indicated by the dashed lines in the connection to backplane 26 and the shaded area in the case of the NAC 27. To be "disabled" does not necessarily mean a physical and/or electrical connection is severed. Rather, the external interface 44 is made unavailable (e.g., invisible) to users of system 10.

Because their external interfaces 44 are disabled, auxiliary management processors 40 may be configured to interact with entities that are external to the system 10, or even with enclosure controller 22, exclusively through the primary management processor 38 their partition 32 using an internal interface 46 established with the primary management processor 38. Internal interfaces 46 may be invisible and/or inaccessible by all entities except for the primary management processor 38 of the partition.

Auxiliary management processor 40 may send and receive communications containing various information, such as device health information or power/reset commands, through internal interface 46. In other words, external communications directed to or from any management processor of a partition may be routed through the primary management processor 38.

Figure 2:
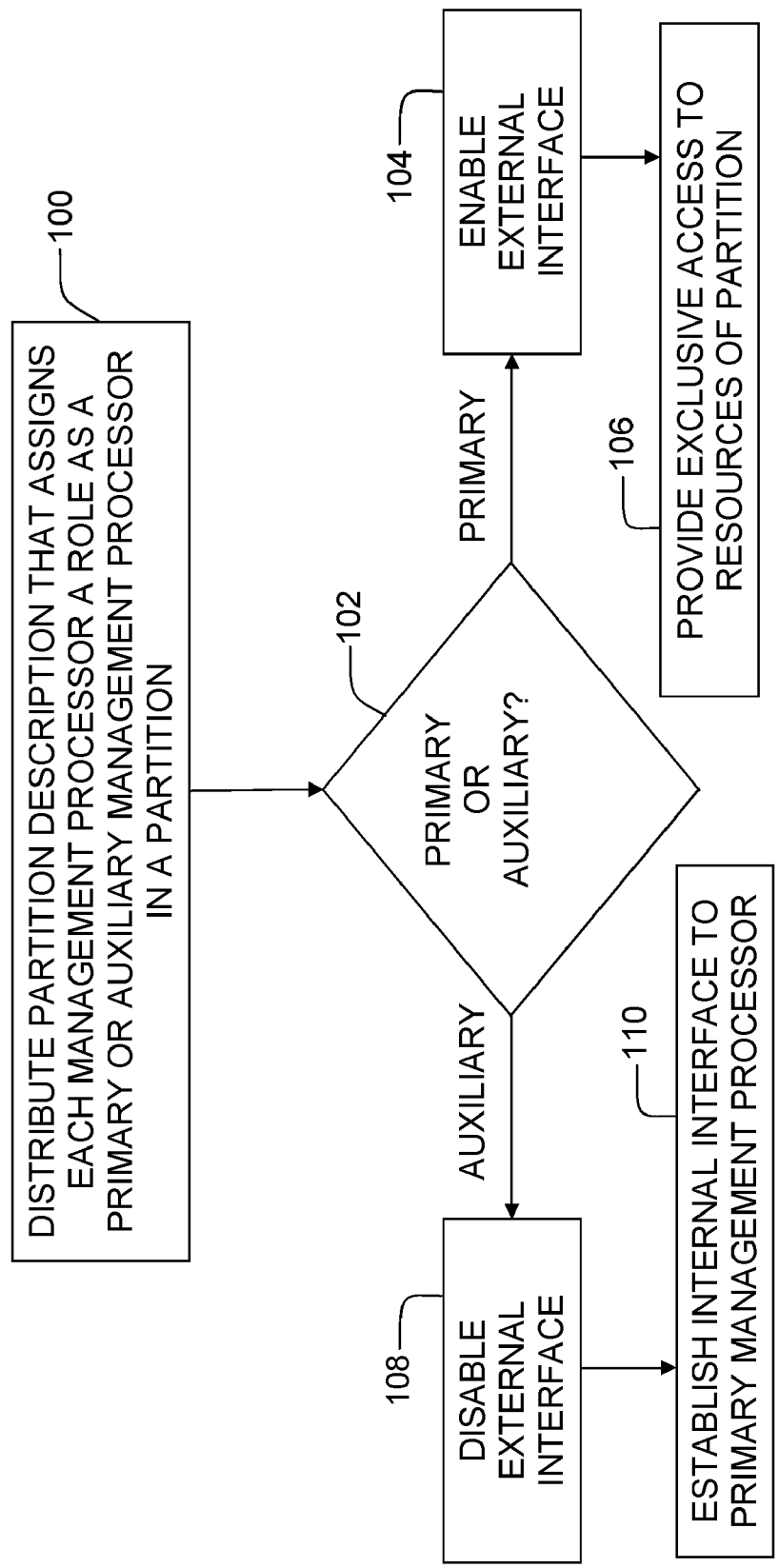
FIG. 2 depicts an example method of allocating a plurality of computing components among one or more logical partitions according to an embodiment of the invention.

FIG. 2 depicts a method of allocating a plurality of computing components 16 among a plurality of logical partitions 32. In step 100, partition description information is distributed (e.g., by DMC 42) to the management processor 28 of each computing module 16 of the plurality of computing modules 16 of enclosure 14. As noted above, DMC 42 may have received the partition description from an entity outside of enclosure 14 prior to step 100.

Next, at step 102, each management processor 28 reads the partition description to determine in which partition that management processor's computing module 16 belongs, as well as that management processor's role in the partition.

If, at step 102, the management processor 28 determines that it is a primary management processor 38, then the management processor 28 may enable an external interface 44 (if the external interface 44 is disabled) at step 104. At step 106, the primary management processor 38 thereafter provides exclusive access to resources associated with the partition of which it is a member.

For example, if a system administrator wishes to ascertain the device health of a particular computing component 16 of the partition, the administrator may direct his or her device health request to the primary management processor 38 of the partition through an enabled external interface 44. Primary processor 38 may then communicate with the target computing component's management processor 28, which presumably is an auxiliary management processor 40, through an internal interface 46 to obtain the target component's device health.

If, at step 102, the management processor 28 determines that it is an auxiliary management processor 40, then may disable its external interface 44 (if it is already enabled) at step 108. At step 110, an internal interface is established between the auxiliary management processor 40 and the primary management processor 38 of the same partition. Thereafter, communications between an outside entity and auxiliary management processor 40 are directed through the primary management processor 38 of the same partition.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A system comprising a plurality of computing components in a logical partition, each of the plurality of computing components having a management processor that is configured to:
   assume a role among management processors of a partition;
   cooperate with other management processors of the partition to control resources of the partition, wherein one of the management processors serve as an exclusive liaison and interface through which device health information or power/reset commands for all the management processors of the partition are routed for communications between the management processors and an outside entity;
   assume a role of primary or auxiliary management processor of a partition;
   enable an external interface, if the external interface is disabled, where the management processor has assumed the role of primary management processor of a partition; and
   disable the external interface, if the external interface is enabled, where the management processor has assumed the role of auxiliary management processor of a partition.

2. The system of claim 1, wherein an internal interface is established between a management processor that has assumed the role of primary management processor of a partition and each management processor that has assumed the role of auxiliary management processor of the same partition.

3. The system of claim 1, wherein each management processor that has assumed the role of auxiliary management processor of a partition is further configured to interact with external entities exclusively through a primary management processor of the partition.

4. The system of claim 1, wherein each management processor that has assumed a role of an auxiliary management processor of a partition is further configured to communicate device health information exclusively through a primary management processor of the partition.

5. The system of claim 1, wherein each management processor that has assumed a role of an auxiliary management processor of a partition is further configured to receive power/reset control commands exclusively through a primary management processor of the partition.

6. The system of claim 1, wherein each management processor that has assumed the role of primary management processor of a partition is further configured to issue commands received from external entities to one or more management processors that have assumed roles of auxiliary management processors of the same partition.

7. The system of claim 1, wherein each management processor that has assumed the role of primary management processor of a partition is further configured to establish a network connection on behalf of the entire partition.

8. The system of claim 1, wherein the external interface includes one or more of a user interface to an operating system executing on the partition and a management interface for controlling resources of the computing component on which the management processor resides.

9. The system of claim 1, wherein each management processor is further configured to assume the role of primary or auxiliary management processor in response to a partition description that allocates the plurality of computing components among the one or more logical partitions.

10. The system of claim 9, further comprising a domain management processor that is configured to transmit the partition description to each of the management processors.

11. The system of claim 10, wherein the domain management processor is executing on a predetermined management processor of the management processors of the plurality of computing components.

12. A method of allocating a plurality of computing components among a logical partition, comprising:
distributing a partition description to each of the plurality of computing components that assigns a management processor of the computing component a role as a primary or auxiliary management processor in a partition;
providing access to resources of a partition exclusively at the primary management processor of the partition;
providing an external interface to health information for each of the plurality of computing components and for power/reset commands for each of the plurality of computing components exclusively through the primary management processor;
enabling the external interface, if the external interface is disabled, where the management processor has assumed the role of primary management processor of a partition; and
disabling the external interface, if the external interface is enabled, where the management processor has assumed the role of auxiliary management processor of a partition.

13. The method of claim 12, further comprising routing external communications directed to any management processor of a partition through the primary management processor.

14. The method of claim 12, wherein the resources of the partition include one or more of an operating system executing on one or more computing components of the partition and a network connection of the partition.

15. A computing component for use in a system of a plurality of computing components in a logical partition, the computing component having a management processor comprising:
means for assuming a primary or auxiliary role in a partition;
means for cooperating with other management processors of the partition to control resources of the partition, wherein the management processor assuming the primary role in the partition serves as an exclusive liaison and interface through which device health information or power/reset commands for all the management processors of the partition are routed for communications between management processors and an outside entity;
means for enabling the external interface, if the external interface is disabled, where the management processor has assumed the role of primary management processor of a partition; and
means for disabling the external interface, if the external interface is enabled, where the management processor has assumed the role of the auxiliary management processor of a partition.

16. The computing component of claim 15, wherein the resources of the partition include an interface to an operating system executing on one or more computing components of the partition.

17. The computing component of claim 15, wherein the resources of the partition include the management processor of the computing component.

18. The computing component of claim 15, wherein the resources of the partition include a network access interface of the computing component.

* * * * *